United States Patent [19]

Darrow et al.

[11] 4,023,249
[45] May 17, 1977

[54] METHOD OF MANUFACTURE OF COOLED TURBINE OR COMPRESSOR BUCKETS

[75] Inventors: Kenneth A. Darrow, Sprakers; John W. Daly, Quaker Street, both of N.Y.

[73] Assignee: General Electric Company, Schenectady, N.Y.

[22] Filed: Sept. 25, 1975

[21] Appl. No.: 616,563

[52] U.S. Cl. .................... 29/156.8 H; 416/96 R; 416/241 R
[51] Int. Cl.² .................................. B23P 15/04
[58] Field of Search ............. 29/156.8 B, 156.8 H, 29/459; 416/241, 224, 229, 96 R, 97 R, 95; 427/34

[56] References Cited

UNITED STATES PATENTS

| | | | |
|---|---|---|---|
| 2,641,439 | 6/1953 | Williams | 29/156.8 B |
| 2,648,520 | 8/1953 | Schmitt | 29/156.8 H |
| 2,993,678 | 7/1961 | Schultz et al. | 416/241 |
| 3,068,556 | 12/1962 | Kramer | 29/156.8 B |
| 3,269,856 | 8/1966 | Jones | 427/34 |
| 3,748,110 | 7/1973 | Hodshire et al. | 416/241 |
| 3,841,805 | 10/1974 | Zalis | 416/241 |

FOREIGN PATENTS OR APPLICATIONS 205,607  1/1957  Australia ............. 29/156.8 H

*Primary Examiner*—C.W. Lanham
*Assistant Examiner*—Daniel C. Crane
*Attorney, Agent, or Firm*—Leo I. MaLossi; Joseph T. Cohen; Jerome C. Squillaro

[57] ABSTRACT

Airfoil-shaped bucket cores having grooves recessed into the surfaces thereof must be covered with an outer layer to provide the requisite aerodynamic and wearing surface and to define the cooling passages. In order to apply this outer layer by flame spraying (or comparable method of particle deposition), the core surface is first covered with a substrate layer. This substrate layer is provided with means by which later-applied surface coating material will be anchored in place. Thereafter, the outer material is applied (as by flame spraying, for example) and the surface thereof is ground and polished to dimension as may be needed.

9 Claims, 5 Drawing Figures

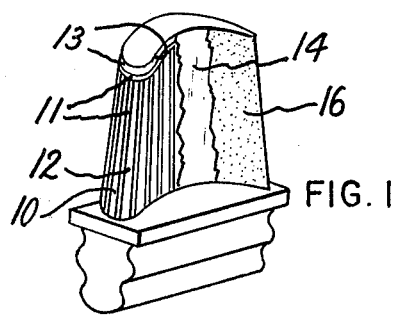

- FIRE CORE 10 IN OXIDIZING ATMOSPHERE; e.g. AIR
- FILL COOLING CHANNELS 11 WITH POLYMER FILLER MATERIAL
- ABRADE SURFACE OF CORE 10 TO REMOVE FILLER AND OXIDE FROM LANDS 12, SURFACES 13
- BLAST TO CLEAN AND ROUGHEN LANDS 12, SURFACES 13
- OPTIONAL: NICKEL PLATE LANDS 12, SURFACES 13
- REMOVE REMAINING POLYMER FILLER MATERIAL

FIG. 3a

- APPLY THIN LAYER ALUMINUM TO CORE 10
- FIRE CORE 10 IN OXIDIZING ATMOSPHERE; e.g. AIR
- FILL COOLING CHANNELS 11 WITH POLYMER FILLER MATERIAL
- ABRADE SURFACE OF CORE 10 TO REMOVE FILLER AND OXIDE FROM LANDS 12, SURFACES 13
- BLAST TO CLEAN AND ROUGHEN LANDS 12, SURFACES 13
- OPTIONAL: NICKEL PLATE LANDS 12, SURFACES 13
- REMOVE REMAINING POLYMER FILLER MATERIAL

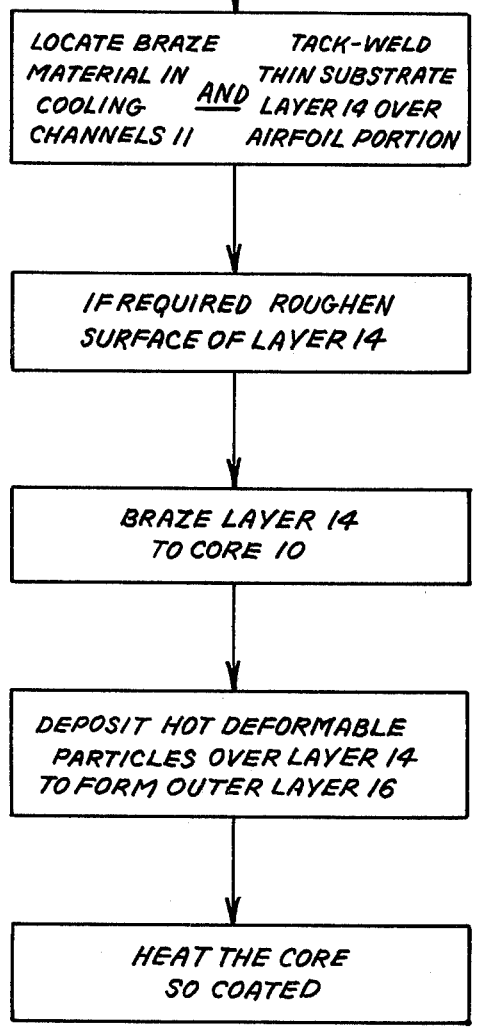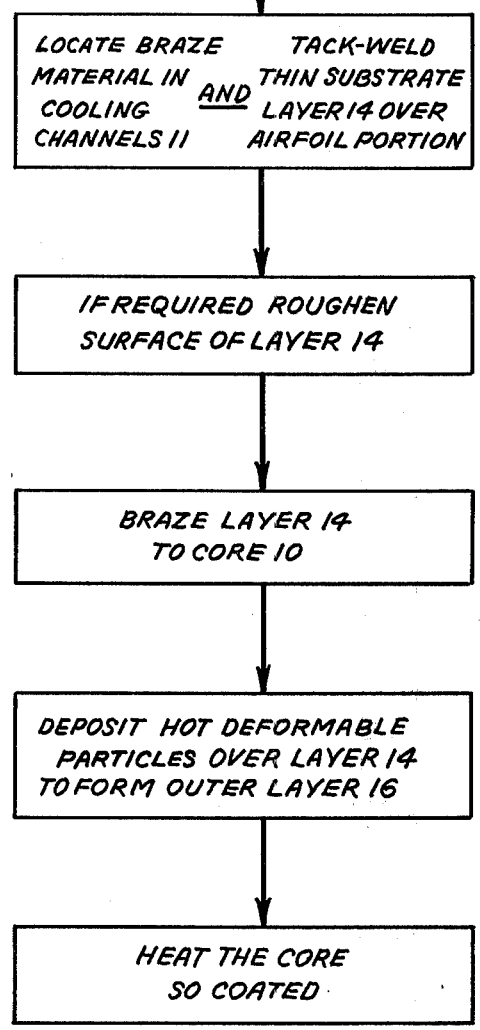

METHOD OF MANUFACTURE OF COOLED TURBINE OR COMPRESSOR BUCKETS

BACKGROUND OF THE INVENTION

A general process for producing a turbine or compressor blade having a plurality of passages therein relatively close to the surface for passage of fluid therethrough for cooling the blade is set forth in U.S. Pat. No. 2,641,439 — Williams. The Williams patent is incorporated by reference.

The Williams patent provides that in forming a turbine blade the surface of the core has formed therein a plurality of grooves separated by ridges. Cover for these grooves to define passages for the conduct of cooling fluid during use is provided by plating a layer of metal over the bucket core, the grooves first being filled with a material such as aluminum, cadmium or a graphite-containing wax. Thereafter, one or more layers of metal are deposited thereover by electrodeposition forming the skin. The skin having been deposited and bonded in place, the patent describes the removal of the filler material to leave open passages defined by the grooves and the metal skin deposited thereover.

The art is in constant need of easier and more economical techniques for the application of skin over bucket cores of compound curvature to provide cooling passages. It is to this problem that the instant invention is directed.

DESCRIPTION OF THE INVENTION

Attempts to apply an outer working layer (or skin) by particle deposition (e.g., flame or plasma spray) over an airfoil core having grooves recessed into the surface thereof have usually been unsuccessful for lack of availability of a material to fill the grooves; such material having the characteristics of (a) being able to withstand surface roughening, as by sand blasting, yet (b) being substantially completely removable from each groove at some desired point in the manufacturing process (e.g., by dissolution in some suitable solvent. Erosion of the airfoil core surface is, of course, required prior to outer layer particle deposition so that the entire surface of the casting will provide "tooth" enabling the hot deformable particles to firmly adhere upon impact on the core surface. Filler materials meeting both the above criteria have yet to be found.

The instant invention avoids the problem of relying upon such a filler material and instead provides a rough surface to which the particles being deposited can adhere without the necessity of eroding (e.g., sand blasting) the airfoil core surface. This is accomplished by covering the outer surface of the core (spanning the grooves) with a substrate layer that has or is provided with means by which the later-applied hot deformable particulate material can anchor itself in place. Thereafter, as the particulate material is applied (as by flame spraying, for example, either in a layered skin arrangement or as a relatively homogeneous skin) positive keying to the substrate layer is achieved. The use of a thin metallic subskin as the substrate layer is described.

BRIEF DESCRIPTION OF THE DRAWING

The subject matter for the instant invention for which protection is sought is presented as claims at the conclusion of the written description of the invention set forth herein. The description sets forth the manner and process of making and using the invention and the best mode. The accompanying drawing forms part of the description schematically setting forth the process flows presented in the application.

FIG. 1 is a view partially cut away to show the interrelationship of the bucket components upon which the process steps are conducted. The left-hand flow diagram (FIGS. 2a and 2b) applies when material is initially present at the recessed surfaces of the cooling channels, which, when oxidized, will provide oxide surfacing that is not reducible in dry hydrogen. The right-hand flow diagram (FIGS. 3a and 3b) applies when such material is not initially present at the recessed surfaces of the cooling channels.

MANNER AND PROCESS OF MAKING AND USING THE INVENTION

For vanes (turbine or compressor buckets) in which the cooling function is to be achieved by the flow of liquid in subsurface cooling channels, the airfoil core material should be both corrosion and erosion resistant. This invention is equally applicable to buckets having radially directed coolant passages (U.S. Pat. No. 3,736,071 — Kydd) and serpentine configured cooling channels (U.S. Pat. No. 3,849,025 — Grondahl).

Having selected a material, the bucket core complete with the groove system selected for the ultimate cooling system is provided. Next, by a series of steps the grooved surfaces are covered with a layer of oxide material that is stable (not reducible) in dry hydrogen (e.g., aluminum oxide, titanium oxide, zirconium oxide). The procedures therefor are set forth in U.S. pat. application Ser. No. 600,306 — Darrow, filed July 30, 1975 and assigned to the assignee of the instant invention. The Darrow application is incorporated by reference in its description of these procedures.

To provide the oxide layer when the bucket, or airfoil, core is made of an alloy having as a constituent one or more elements such as aluminum or titanium, the core casting is fired in a furnace in air at about 400° C. for a short period of time (e.g., about 1 hour). The entire surface of the airfoil core will now be covered with a thin layer of non-reducible oxide. In those instances in which the material of which the airfoil core is made will not provide the requisite oxide coating upon being heated in air, the airfoil core is cleaned chemically (e.g., acid etch) or vapor blasted and a coating of pure aluminum (about 1000 – 2000 A in thickness) is vapor deposited or sputtered over the surface thereof. Next, the part is fired in an air furnace in the manner described herein above.

In either instance, after the requisite oxide coating of sufficient (several Angstroms is enough) thickness has been formed over the airfoil core surface, the recessed grooves for the cooling channels are filled with a polymer material readily removable by dissolution as will be described hereinbelow. When the channels have been filled (or overfilled) enough to withstand subsequent processing without exposing the oxide layer covering the grooved surfaces, the airfoil core surface is abraded (as with a belt sander) to remove from the top of the lands between the grooves any polymer filler and all of the oxide formation. Next, the core is bead blasted to remove excess polymer filler and oxide formation from small surface cavities missed in the abrading operation.

The abrading and bead blasting operations will have exposed and cleaned only the tops of the lands and, preferably, the airfoil core next receives an electroplated coat of bright nickel (e.g., 0.2 – 0.6 mil coating) only on these exposed areas.

After the abrading and bead blasting operations (or after the application of the nickel coat, if employed) the polymer filler is removed. This is accomplished quickly (about 30 seconds) in a vacuum degreaser where the polymer is exposed to, and dissolved by, hot solvent (e.g., trichloroethylene) vapors.

At this point in the process, the airfoil core has the recessed surfaces of its grooves covered with an appropriate oxide that is not wet by molten braze alloy and the rest of the surface, such as the lands between the grooves, has been exposed and cleaned and, optionally, has received a coating of bright nickel.

The next structural modification to be made of the airfoil core is the application of the substrate layer. This substrate layer must conform to the surface of the airfoil and, as the conformation is accomplished, the substrate layer is tack-welded into place spanning the grooves. Thereafter, the substrate layer is adhered by brazing to the lands and other core surface area to be covered. Preparation of the airfoil core for brazing of the substrate layer thereto may be accomplished either before or after the tack-weld application of the substrate layer to the core surface. Preparation before the tack-welding operation comprises depositing braze alloy (for example, copper or silver braze material) into the grooves by spraying over the core surface particulate braze alloy together with depolymerizable polymer solution to act as a binder to hold the powdered braze alloy in place. After the braze alloy/organic binder mix has been sprayed over the airfoil core surface and dried, mild buffing of the core surface will remove that deposited material not in the grooves. For preparation of the airfoil core for brazing after the substrate layer has been tack-welded into place, braze alloy wire may be inserted into the grooves under the tack-welded substrate layer. This latter technique can be employed, of course, only when open ends of the grooves are available.

Selection of the substrate layer material, typically a thin metal subskin 3 – 5 mils thick, is accomplished with the aim of avoiding building in stresses. Preferably the material of the substrate layer will be the same as the material of the airfoil core. If this accommodation cannot be made, the material of the substrate layer should at least have a similar coefficient of thermal expansion.

Among the useful braze materials are most of the Nicrobraz series of alloys, silver brazes such as Nicusil 3 and 559 (Handy and Harmon), and Nioro, Nicoro 80 or Palniro 7 (Western Gold and Platinum). Practically all of braze metals used, with the exception of copper, are used in an alloy form. Most are alloys of gold, silver, or nickel using copper, silicon, boron, tin, etc. as alloying elements. The alloys are used, because they have melting temperatures, which are usually much lower than the melting temperatures of the principal constituent.

Excess braze metal should not be used, however, and the correct amount to be disposed in the grooves for a given braze joint is determined by rountine experimentation or previous experience.

Considering the use of a thin metal subskin as the substrate layer, the skin is spot welded into place using an electrode wide enough so that in pressing against the skin it cannot penetrate into the grooves of the core and will bridge the lands with the tack-welds being applied to the lands. The skin material may be cut into as many pieces as necessary to make it conform evenly to the airfoil core surface. Some very small amounts of stretching of the subskin may be accomplished by gentle hammering thereof as the welding progresses. The spot welds are placed about one-eighth to one-quarter inch apart and no attempt is made to have a continuous weld.

After the substrate layer has been spot welded into place, unless the layer is already provided with surface imperfections on a macroscopic scale to which keying can be accomplished, the outer surface thereof must be roughened, as by being provided with anchoring means bonded thereto.

Anchoring means to be applied to the outer surface of a smooth substrate layer comprises a mixture of finely divided metallic and braze particles deposited thereover together with a polymerizable polymer binder solution. The polymer binder temporarily adheres the mixed metallic and braze powders to the surface of the substrate layer until a brazing operation can be conducted to permanently bond the metallic powder to the surface. If desired, the application of the polymer binder solution to the surface may precede the application of the metallic powders, after which the mixture of metallic powders is applied as by dusting, spraying, sprinkling, etc.

Depolymerization polymer binder materials useful in the practice of this invention include polymethacrylates (e.g., polymethylmethacrylate, polyisobutyl methacrylate, etc.), polyoxymethylene, polychloral, poly-1,1-diphenylethylene, poly-2,4-dimethyl styrene, polymethacrylonitrile, poly-N-hexyl isocyanate, and other polymers readily selectable for this use by reference to section II, (pages 38–95) of the Polymer Handbook (Edited by J. Brandrup et al., Interscience 1966). The appropriate consistency of polymer solution for application of the polymer filler is obtained by controlling the amount of solvent added thereto. Thus, for a brush-type application 25 gms of isobutyl methacrylate polymer may be dissolved in about 100 cc of toluene.

The phenomenon of depolymerization as defined herein requires that the polymer be readily converted to the monomer state and that there be no charred residue. With materials meeting these criteria the brazing operation to follow, which is conducted at a temperature in excess of both the depolymerization temperature and the boiling point of the monomers, will suffice to completely remove the polymeric binder material.

Typically, the brazable/brazing powder combination to be used to apply anchoring means to the substrate layer will present refractory metallic particles (e.g., tungsten carbide/cobalt mixture) and, as the braze powder, powdered copper or a braze alloy. Ratios in the range of from seven parts metallic powder to three parts braze powder to five parts metallic powder to one part braze powder have been successfully employed. Before use, the two powders are to be mixed thoroughly.

Having temporarily affixed the anchoring means to a substrate layer having an otherwise smooth surface, the assembly is next fired in a furnace in a hydrogen environment at a temperature (e.g., 1100 – 1200° C.) high enough to melt the brazing system(s) employed, but not the anchoring means. In this operation the substrate layer will be brazed to the lands (and other outer surface of the airfoil core contacted thereby) while the anchoring particles are brazed to the outer surface of the substrate layer leaving a very rough surface to which subsequently applied particulate coating will key very well. During this brazing operation, the brazing system previously located in the grooves will, because of the non-wettable nature of the groove surfaces recessed into the core, leave the grooves upon being melted and cover the inner surface of the substrate layer entering between the substrate layer and the lands to firmly braze the substrate layer to the lands over the contiguous surfaces. Also, during the brazing operation, the polymer binder is depolymerized and completely removed. Any loose particles are then removed from the outer surface as, for example, by a light sandblasting of the outer surface.

Now that a good anchoring surface has been provided over the surface of the airfoil core and the core grooves have been covered to define the cooling channel system, a covering of outer material is applied by the deposition (e.g., by flame spraying) of hot deformable particles over this surface. Upon impact the particles change shape and adjust to the irregularities of the surface to key this layer of outer material in place. Finally, the surface of the outer layer is ground and/or polished as required. As indicated hereinabove, this coating may be substantially homogeneous or non-homogeneous, and may consist of one or more materials depending upon the properties desired. The outer surface, of course, must provide both erosion and corrosion resistance for the completed bucket or nozzle.

The following materials have been successfully employed first to provide the requisite anchorage on the smooth surface of a thin metal subskin bonded to, and covering grooves in, an airfoil core and then to provide the outer surface of the airfoil. Thus, a powdered mixture of Metco 439 and Metco 55 (pure copper powder) in the ratio by weight of 100/20 was sprayed over the outer surface of a thin metal subskin of the same material as the airfoil core, the metal subskin having been previously coated with a thin layer of isobutyl methacrylate polymer in toluene. The composition of the Metco 439 is:

| | |
|---|---|
| WC + 12% Co | 50% |
| Cr | 6% |
| Al | 3% |
| Fe | 1.5% |
| Si | 1.5% |
| B | 1% |
| C | .5% |
| Ni | Balance |

This construction has been prepared (a) using an airfoil core and metal subskin (4 mils thick) of 347 stainless steel and (b) using an airfoil core and metal subskin (4 mils thick) of Carpenter X-15 alloy.

After the brazing operation in which the metal subskin was brazed to the surface of the airfoil core, tungsten carbide particles (about 4 mils in diameter) were simultaneously copper bonded to the outer surface to produce a coating having roughness on the scale of about 4 – 6 mils. After removal of any loose particles, the same mixture of Metco 439 and Metco 55 was flame sprayed over that rough surface. Unless the flame spraying is done in quick passes the thin subskin disposed between the lands may become overheated. This should be avoided and in addition it is desirably to let the part cool between passes and apply a series of thin coats, rather than one heavy coat in a continuous operation.

It may also be desirable when the coating has been partially deposited, to shot peen the surface. Shot peening will introduce compressive stresses into the coating to neutralize the shrinking stresses that occur during cooling of the sprayed material. Also, shot peening will serve to densify the coating material.

If desired, when the outer layer is formed by the deposition of a mixture of hot brazable metallic particles and particles of brazing metal (as, in the application of the Metco 439 and Metco 55 combination by flame spraying), the composition of particle mix may be changed for successive passes in order that less and less brazing material will be deposited in the flame sprayed coat or one brazing material may be substituted for another (e.g., replacing copper with silver solder).

In the previous constructions using the Metco 439/Metco 55 combination, when a coating of sufficient thickness had been built up, the airfoil was fired again in hydrogen at 1100° C. to permit the copper to permeate the coating, bond it together internally and bond it to the roughened surface of the metal subskin. The presence of the copper should provide improved heat transfer and also contribute some ductility to the outer coating.

After this firing operation, the airfoil may be ground and polished by the usual methods.

The macroscopic roughness provided on the substrate layer should be on the scale of about 4 – 10 mils. In the case of applying anchoring means to the smooth surface of a substrate layer as described hereinabove the metallic particles to be bonded to the substrate layer surface are preferably in the size range 100 – 140 U.S. Standard Sieve or 100 – 150 Tyler Scale.

Substrate layer material need only be structurally capable of covering the grooves, being bonded to the lands and receiving the rest of the outer layer, which will provide the working surfaces of the vane. Dimensionally the substrate layer can be expected to range in thickness from 3 – 10 mils, while the balance of the outer layer may range from about 20 to about 30 mils. Thus, the erosion-corrosion resistant outer layer, because of the functions exercised thereby, can be from about 2 to about 10 times as thick as the substrate layer and must, of course, be much harder and stronger.

As will be clear from the description of the best mode of this invention, the hot, deformable particles to be applied over the roughened substrate layer to form the balance of the outer coating may be a single material, rather than a combination of materials. In each instance, however, it is necessary to heat the airfoil after the outer coating has been applied to relieve stresses and/or to develop a metallurgical bond at interfaces in the structure.

BEST MODE CONTEMPLATED

In the preferred construction for a liquid cooled turbine bucket the airfoil core would be made of a corrosion and erosion resistant material such as Inconel 718. Among the constituents of this alloy are aluminum (0.8% by weight), titanium (0.65 – 1.40% by weight) and columbium (4 – 5% by weight).

Thus, such an airfoil core of Inconel 718 having grooves recessed in the surface thereof is fired in an air furnace at about 400° C. for about 1 hour. Any clean surface that may have been present will now be entirely covered with a layer of oxide material not reducible in dry hydrogen.

Next, the recessed channels are filled with clear isobutyl methacrylate in toluene. The airfoil core is then sanded with a belt sander to smooth off the airfoil surface and remove all polymer and oxides from the top of the lands. The bucket core is then bead (glass or alumina) blasted to remove excess polymer and oxides residing in small cavities (surface imperfections) from which these materials were not removed by the sanding operation.

As the next step, the bucket core is subjected to electrodeposition and, since only the tops of the lands were exposed and cleaned, these areas alone are plated with a coating of bright nickel (0.5 – 0.3 mils thick). The purpose of the nickel plating is to provide specific areas, which will be sought out by the molten brazing material in the brazing operation to follow.

A uniformly thick sheet of Inconel 718 3–5 mils thick is cut to fit the airfoil surface in one or more pieces as may be necessary in order to closely fit over the airfoil surface.

Isobutyl methacrylate polymer is introduced into the grooves in order to provide temporary anchorage for the powder braze alloy, which is next sprayed into these grooves. The braze alloy is preferably Nicrobraz 30 having the composition by weight: Cr 19.0%, Si 10.2% and Ni 70.8%.

Next the metal sheet of Inconel 718 is spot welded into place using an electrode wide enough to bridge from land to land thereby avoiding depressing the metal subskin into the grooves. In this manner, the metal subskin layer is spot welded (welds about one-eight – one-quarter inch apart) to cover the airfoil core. Very small amounts of stretching of the thin sheet can be achieved by hammering on the sheet as the welding progresses thereby maximizing conformation to the airfoil surface.

After the metal sheet is spot welded in place, the outer surface thereof is covered with a thin layer of isobutyl methacrylate polymer providing a tacky surface. A mixture of Metco 439 (particle size ~ 4 mils in diameter) and Nicrobraz 30 powders in the ratio of 70/30 to 80/20 by weight is prepared and applied over the outer surface of the metal subskin by spraying. This assembly is then fired in dry hydrogen at about 1200° C. to accomplish the brazing step. After brazing, any loose particles are removed from the surface of the part.

Next, 20–30 mils of copper is applied over the roughened outer surface of the metal subskin by flame spraying and then the copper coated part is fired in hydrogen at 1000° C. to stress-relieve the copper and metallurgically bond it to the subskin.

The outer surface of the copper layer is then roughened by metal grit blasting on a macroscopic scale and this surface is then coated by flame spraying with 347 stainless steel to provide a total skin thickness of about 50 mils. This flame spray deposition is done in quick passes, letting the part cool between passes.

When a sufficient thickness of the exterior coating has been built up, the airfoil is fired once more in hydrogen at 1000° C. to provide stress-relief and to bond the coating to the copper layer underneath. Finally, the airfoil is shaped to the extent necessary by grinding, belt sanding or machining.

If desired, the oxidation resistance of the 347 stainless steel can be further improved by the application of vapor coating to the outer surface of the vane, a surface layer as described in U.S. Pat. No. 3,676,085 — Evans et al.

The term "vane", where employed, is intended to encompass an airfoil-shaped element (including a root structure) as is used both in high temperature turbo machines and in compressor rotors in which cooling is required.

The term "metallic" as employed in the following claims is intended to describe the nature of the materials used in the hot particle deposition typically accomplished by flame spraying. These materials may be in the form of single metals, multiple metals, preformed alloys and metal-like systems including at least in part refractory materials such as carbides, borides, nitrides and silicides of refractory metals.

We claim:

1. In the manufacture of a vane adapted for mounting in a machine in which the airfoil surfaces of the vane are to be subjected to contact with hot gas by the method wherein an erosion-corrosion resistant outer layer is applied in the form of hot deformable particles over an airfoil-shaped core and bonded thereto, said core having at least one groove recessed into the airfoil-shaped surface thereof and said outer layer being extended over said at least one groove to define a subsurface passage for the transport of a cooling fluid therethrough during operation, the improvement comprising the steps of:

providing over the airfoil-shaped surface of said core a substrate layer having the outer surface thereof roughened on a macroscopic scale, brazing said substrate layer along the inner surface thereof to said airfoil-shaped surface of said core extending over any grooves therein, depositing the erosion-corrosion resistant outer layer over said substrate layer in the form of hot deformable particles interlocking with the roughened outer surface thereof, and heating the core so coated in a hydrogen environment whereby said erosion-corrosion resistant layer is stress-relieved and bonded to said substrate layer.

2. The improvement of claim 1 wherein the substrate layer is a substantially uniformly thick metal sheet having metallic particles bonded to one face thereof.

3. The improvement of claim 2 wherein the metallic particles contain a refractory metal compound.

4. The improvement of claim 2 wherein the metal sheet has a thickness in the 3–5 mil range.

5. The improvement of claim 1 wherein the substrate layer is made of the same material as the airfoil core.

6. The improvement of claim 1 wherein the erosion-corrosion resistant outer layer is applied in a series of thin coats.

7. The improvement of claim 1 wherein the outer surface of the outer layer is shaped and polished.

8. The improvement of claim 1 wherein the outer layer contains tungsten carbide.

9. The improvement of claim 8 wherein the outer layer also contains a nickel alloy.

* * * * *